United States Patent
Fujii et al.

(10) Patent No.: US 7,364,110 B2
(45) Date of Patent: Apr. 29, 2008

(54) CABLE APPARATUS

(75) Inventors: Michihiro Fujii, Kato-gun (JP);
Hiroyuki Kawai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/274,292

(22) Filed: Nov. 16, 2005

(65) Prior Publication Data
US 2006/0060688 A1 Mar. 23, 2006

Related U.S. Application Data

(63) Continuation of application No. PCT/JP03/07098, filed on Jun. 5, 2003.

(51) Int. Cl.
*B65H 75/30* (2006.01)

(52) U.S. Cl. .................. 242/394; 242/388.6; 242/395; 242/404.3; 242/406

(58) Field of Classification Search ............. 242/388.5, 242/388.6, 394, 395, 395.1, 406, 388.1, 404.3; 191/12.2 R
See application file for complete search history.

(56) References Cited

U.S. PATENT DOCUMENTS 1,910,597 A * 5/1933 Elliott ..................... 242/404.3

6,015,110 A * 1/2000 Lai ......................... 242/388.1
2002/0023814 A1* 2/2002 Poutiatine ............... 191/12.2 R

FOREIGN PATENT DOCUMENTS

| JP | 9-307801 A | 11/1997 |
|---|---|---|
| JP | 10-144427 A | 5/1998 |
| JP | 11-290281 A | 10/1999 |
| JP | 2000-49472 A | 2/2000 |
| JP | 2001-28721 A | 1/2001 |
| JP | 3078802 U | 4/2001 |
| JP | 2002-179341 A | 6/2002 |
| JP | 2003-112857 A | 4/2003 |
| WO | WO 02/093708 A1 * | 11/2002 |

* cited by examiner

*Primary Examiner*—Peter M. Cuomo
*Assistant Examiner*—William E Dondero
(74) *Attorney, Agent, or Firm*—Arent Fox LLP

(57) ABSTRACT

In relation to cables, a cable apparatus, which enhances downsizing by housing a cable when not in use and operability at the time of housing and pulling-out operations, is provided. The cable apparatus for use in connecting electronic apparatuses comprises a chassis housing a cable with connector units connected to the electronic apparatuses; a winding mechanism winding and housing the cable within the chassis; and an operation unit applying a turning force to the winding mechanism and allowing the winding mechanism to wind the cable, wherein the operation unit is pulled up from the chassis to allow the winding mechanism to wind the cable when operated and is pulled down toward the chassis when not operated.

13 Claims, 14 Drawing Sheets

CABLE APPARATUS

CROSS-REFERENCE TO RELATED APPLICATIONS

This application is a continuation of International Application No. PCT/JP03/07098, filed on Jun. 5, 2003, now pending, herein incorporated by reference.

BACKGROUND OF THE INVENTION

1. Field of the Invention

The present invention relates to cables used with portable terminals such as a cellular phone, PDC (Personal Digital Cellular) device, PDA (Personal Digital Assistant), notebook PC (Personal Computer) and various electronic apparatuses such as various portable electronic devices, and relates to a cable apparatus for housing a cable when not in use and enabling to extend the cable to ensure a necessary length when used.

2. Description of the Related Art

Conventionally, various cables such as modular cables are used for connecting portable terminals such as cellular phone and notebook PC to external devices, and if cables are needlessly long when used, the cables are cumbersome because the cables narrow down and messes up a work space such as a desktop and hinder carrying around or transportation. Also, if the cables are improperly handled, dusts may adhere to connectors, or the cables or the connectors may be damaged.

Therefore, arrangements have been made to wind and house the cables when not in use, for example. As this type of technology, Japanese Patent Application Laid-Open Publication Nos. H09(1997)-307801 and 2002-179341 exist as prior patent documents.

Japanese Patent Application Laid-Open Publication No. H09(1997)-307801 discloses a configuration for winding various cables into an electronic device as well as housing a camera body connected to the cable in the electronic device along with the wound cable. In this electronic device, a spiral spring is used for winding the cables, and since the spiral spring is wound back when the cable is pulled out from the electronic device, the electronic device is configured such that the cable is wound into the electronic device by utilizing the resilience thereof.

Japanese Patent Application Laid-Open Publication No. 2002-179341 discloses a cord housing portion winding a modem cord. This cord housing portion can wind and house the modem cord when not in use and also can wind off an unnecessary length when used.

By the way, in conventional housing and winding of cables, only cables are configured to be housed in electronic devices or housing portions and it is disadvantageous that the housing operation is troublesome. If resilience of a spiral spring is used for winding up, it is disadvantageous that a cable is housed insufficiently when the resilience of the spiral spring is deteriorated.

Although Japanese Patent Application Laid-Open Publication No. 2002-179341 discloses that a plurality of cables are housed within a housing portion, it is disadvantageous that a footprint is increased in the case of a unit with a plurality of winding mechanisms disposed in parallel on a plat plate and that a miniaturized electronic device occupies an usable area of a desktop and gives a bulky feel since cables are housed.

SUMMARY OF THE INVENTION

The present invention was conceived to solve the above problems. The present invention relates to cables and an object thereof is to provide a cable apparatus which enhances down sizing by housing a cable when not in use and operability at the time of housing and pulling-out operations.

In order to achieve the above object, the present invention provides a cable apparatus for use in connecting electronic apparatuses, comprising a chassis housing a cable with connector unit connected to the electronic apparatuses; a winding mechanism winding and housing the cable within the chassis; and an operation unit applying a turning force to the winding mechanism and allowing the winding mechanism to wind the cable, wherein the operation unit is pulled up from the chassis to allow the winding mechanism to wind the cable when operated and is pulled down toward the chassis when not operated.

By configuring as above, in this cable apparatus, the cable with the connector unit is wound by the winding mechanism and housed in the chassis which is a housing portion. Therefore, when used, the cable can be used by unwinding and pulling out the cable from the chassis by a necessary length and when not in use, the cable can be housed in the chassis. The operation unit is used when the cable is pulled out or retracted to operate the winding mechanism. The operation unit is pulled out from the chassis when used and is pulled down and housed into the chassis side when not in use.

To attain the above object, the winding mechanism may be provided with a winding frame that is rotated by the operation unit and that is partitioned with a plurality of winding portions by disposing a flange portion on a middle portion of a winding core, such that the cable may be wound onto each of the winding portions of the winding frame.

To attain the above object, the cable apparatus may be provided with a substrate and be provided with a connection unit connected to the cable. According to such a configuration, the cable can be wound onto the winding portion by rotating the operation unit, so that the cable is housed within the chassis by this winding.

To attain the above object, the chassis may be provided with a support unit supported by an external support member. The support by the support portion contributes to stability of the chassis.

To attain the above object, the operation unit may be attached to the chassis so as to be freely retracted and extended, a clutch portion may be disposed between the winding portion and the operation unit, and the operation unit may be interlocked with the winding portion by pulling out the operation unit.

To attain the above object, the connection unit may be a connector unit divided or connected through the intervention of the substrate.

To attain the above object, two or more winding portions winding the cable may be disposed in the chassis in the axial direction thereof.

To attain the above object, the chassis may be provided on its outer surface portion with a stand unit for supporting the chassis upright, or the chassis may be provided on its outer surface with a clip unit having a support member support the chassis.

To attain the above object, the chassis may be provided with a housing portion for housing the connector unit of the cable.

In this way, the cable apparatus of the present invention has following advantages and benefits.

(a) The cable and the connector unit can be pulled out from the chassis when used; an unnecessary length can be wound and housed in the chassis when the cable is not used or even when used; the cable and the connector unit can easily be pulled out and housed; the cable and the connector unit can be protected by the chassis when not in use; and thus, a convenient cable apparatus can be achieved.

(b) Since the cable apparatus is configured such that the operation unit is pulled up from the chassis to operate the winding mechanism when operated and such that the operation unit is pulled down into the chassis side when not operated, downsizing can be planned when not operated and operability of the winding operation can be enhanced when operated, enabling to provide a downsized cable apparatus which facilitates the winding operation of the cable.

(c) By configuring such that the chassis is provided with a substrate and a connection unit for connecting the cable, connection associated with the cable can be made by utilizing the connection unit and the cable can be multifunctional.

(d) By configuring such that the chassis is provided with a support portion supported by an external support member, the chassis can be easily fixed to the external support member to stabilize installation of the cable apparatus; the cable can be easily guided; a fixed position can be selected; and excessive stress is prevented from being applied to the connector unit.

(e) A contribution can be made to downsizing of the cable connected to an electronic apparatus and to enhancement of functionality of the electronic apparatus with which the cable apparatus is used.

Other objects, features and advantages of the present invention will become more apparent by reference to the accompanying drawings and embodiments.

DETAILED DESCRIPTION OF THE PREFERRED EMBODIMENTS

First Embodiment

Figure 1:
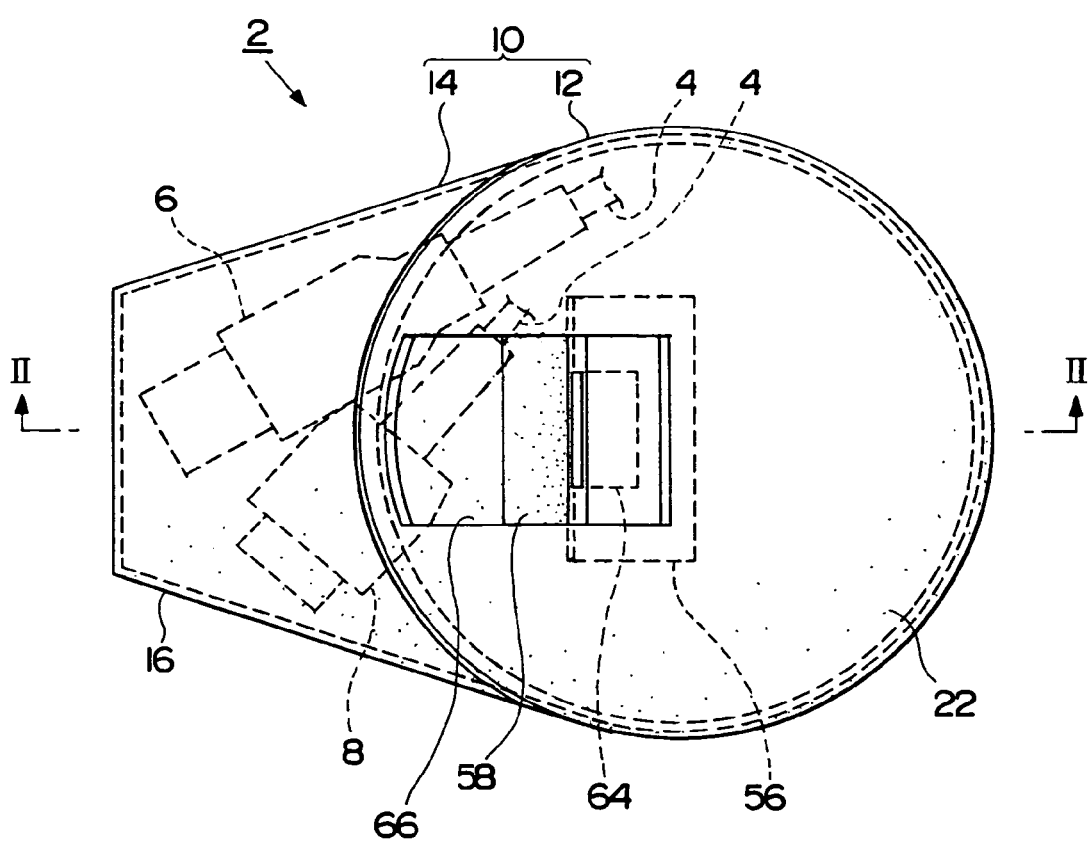
FIG. 1 is a plan view showing a cable apparatus according to a first embodiment of the present invention.
Figure 2:
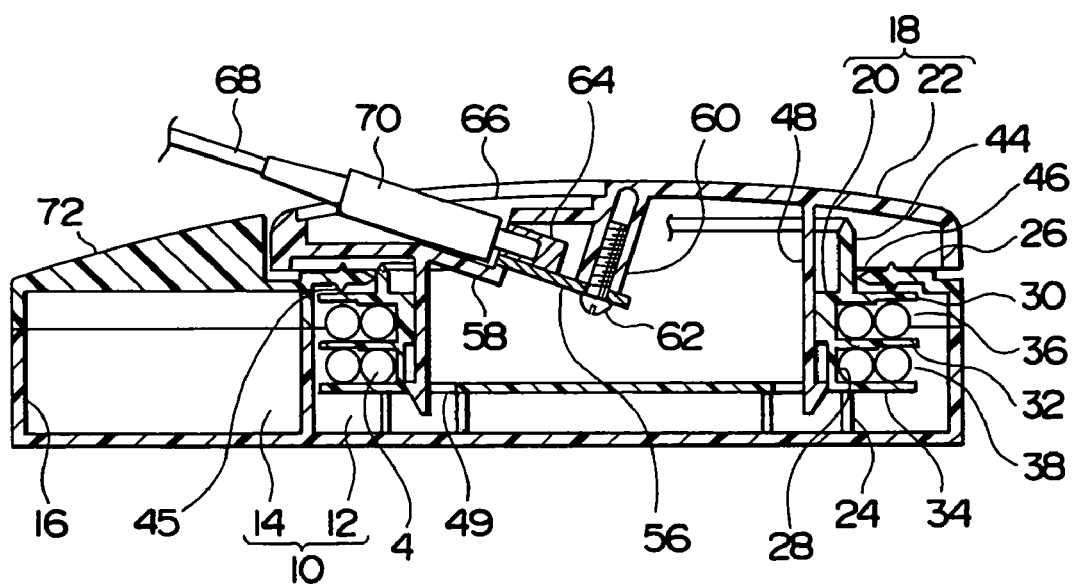
FIG. 2 is a diagram showing a section along a II-II line of the cable apparatus shown in FIG. 1 with connector units of the cable omitted.

A first embodiment of the present invention will be described with reference to FIG. 1 and FIG. 2. FIG. 1 and FIG. 2 show a cable apparatus according to the first embodiment; FIG. 1 is a plan view thereof; and FIG. 2 is a diagram showing a section along a II-II line of the cable apparatus of FIG. 1 with connector units of the cable omitted.

In this cable apparatus 2, a single cable 4 or a plurality of cables 4 are wound and housed so as to be taken in and taken out. First and second connector units 6, 8 are attached to the both ends of the cable 4 for connecting to electronic apparatuses and the like and are used for connection between the electronic apparatuses such as portable terminals and information processing apparatuses. Each connector unit 6, 8 may have an identical form or different specifications or formats. A connector converter is constituted by a cable apparatus 2 consisting of the connector units 6, 8 with different specifications or formats.

A chassis 10 of the cable apparatus 2 is made of, for example, synthetic resin and is provided with first and second housing portions 12, 14; the cable 4 is housed in the housing portion 12; and the connector units 6, 8 attached to the cable 4 are housed in the housing portion 14. In the case of the embodiment, the housing portion 12 is a cylindrical body and the housing portion 14 is a trapezoidal rectangular body formed by extending wall surfaces of the housing portion 12. A gate portion 16 is formed in one (1) side face of the housing portion 14 and the cable 4 and the connector units 6, 8 attached to the ends thereof can be taken in and out through the gate portion 16. The gate portion 16 may be formed each of a plurality of the adjacent side faces.

Figure 3A:
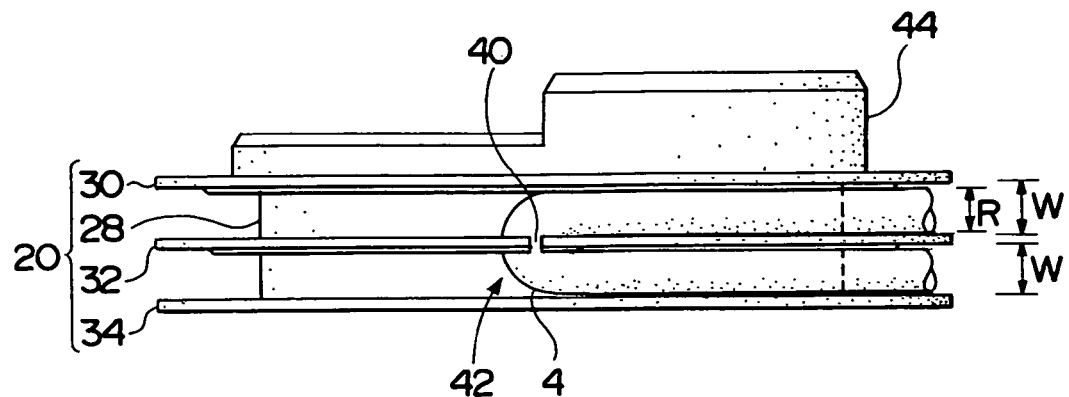
FIG. 3A is a diagram showing a winding frame with the cable attached thereto.
Figure 3B:
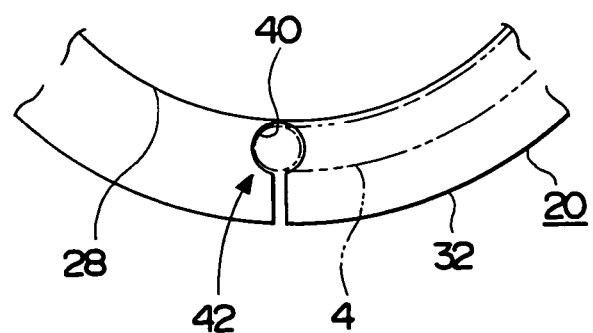
FIG. 3B is a diagram showing a winding start point of the cable.

The housing portion 12 is provided with a winding mechanism 18 for winding the cable 4. The winding mechanism 18 is provided with a winding frame 20 and a winding knob 22 as an operation unit. The winding frame 20 is rotatably supported on a bottom surface on a flat surface of the housing portion 12 by a plurality of projections 24 projected from the under surface side as a rotation support portion and upward movement thereof is limited by a top plate portion 26 partially closing the upper side of the housing portion 12. Therefore, the winding frame 20 can rotate within a certain space in the housing portion 12. In this case, the projections 24 may be formed on the bottom surface of the housing portion 12 and the under surface side of the winding frame 20 may be a flat surface. The winding frame 20 is provided with a cylindrical winding core portion 28 as well as an upper flange portion 30, middle flange portion 32 and lower flange portion 34 around the winding core portion 28 as dividers for dividing a winding space in two, for example, and two winding portions 36 and 38 are constituted by these three (3) flange portion 30, 32 and 34. In this embodiment, the single cable 4 is wound simultaneously onto each winding portion 36 and 38 and, for example, as shown in FIG. 3A and FIG. 3B, the middle flange portion 32 is provided with a penetration portion 40 and the penetration portion 40 is defined as a winding start portion 42 of the cable 4 by penetrating the cable 4 through the penetration portion 40. The winding start portion 42 of the cable 4 may be fixed to the winding core portion 28 or may be movable.

The external diameters of the winding core portion 28 and each flange portion 30, 32, 34 are concentric and, in order to facilitate rotation of the winding core 20, the diameter of each flange portion 30, 32, 34 is set smaller than the inner wall diameter of the housing portion 12. The upper surface of the upper flange portion 30 is provided with a projection 44 having different heights; the projection 44 and the inner edge of an opening 46 of the top plate portion 26 constrains excess movement of the winding frame 20 in the diameter direction; a projection 45 is formed on the under surface side of the top plate portion 26; and since the projection 45 constrains upper movement of the winding frame 20, the rotational position of the winding frame 20 is set to ensure stable rotation of the winding frame 20. In this embodiment, the interval width W of the winding portions 36 and 38 corresponds to the diameter R of the cable 4 to be wound and is set slightly larger than the diameter R (W>R). Therefore, wound cable 4 is guided by each flange 30, 32, 34 to be wound as a two-tiered multilayer (FIG. 2) between the winding portions 36 and 38.

Figure 4:
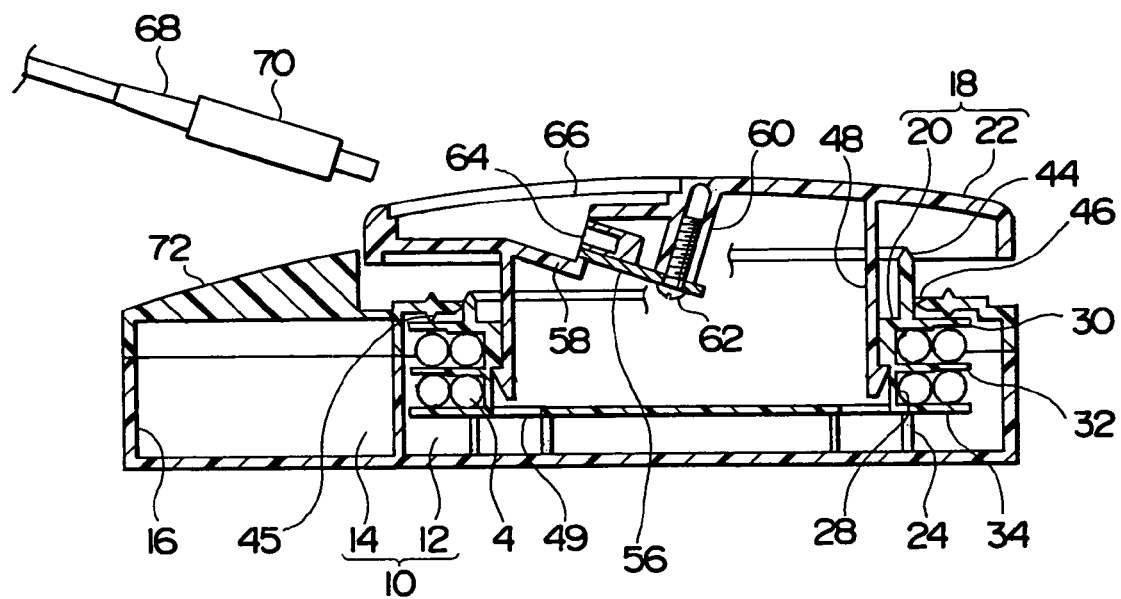
FIG. 4 is a sectional view showing a state that a winding knob is pulled out from a chassis.

The winding knob 22 is made of, for example, synthetic resin and is shaped as a disc having the same diameter as the external diameter of the housing portion 14, correspondingly to the shape of the housing portion 12. On the under surface of the winding knob 22, a plurality of interlock portions 48 is formed in a cylindrical shape. The winding knob 22 is supported by the winding frame 20 so that the winding knob 22 can be rotated and be moved up and down, as shown in FIG. 4, by making each interlock portion 48 penetrate inside of the winding core portion 28 of the winding frame 20 so as to be projected downward from a through-hole 49 on the bottom surface side of the winding frame 20.

Figure 5:
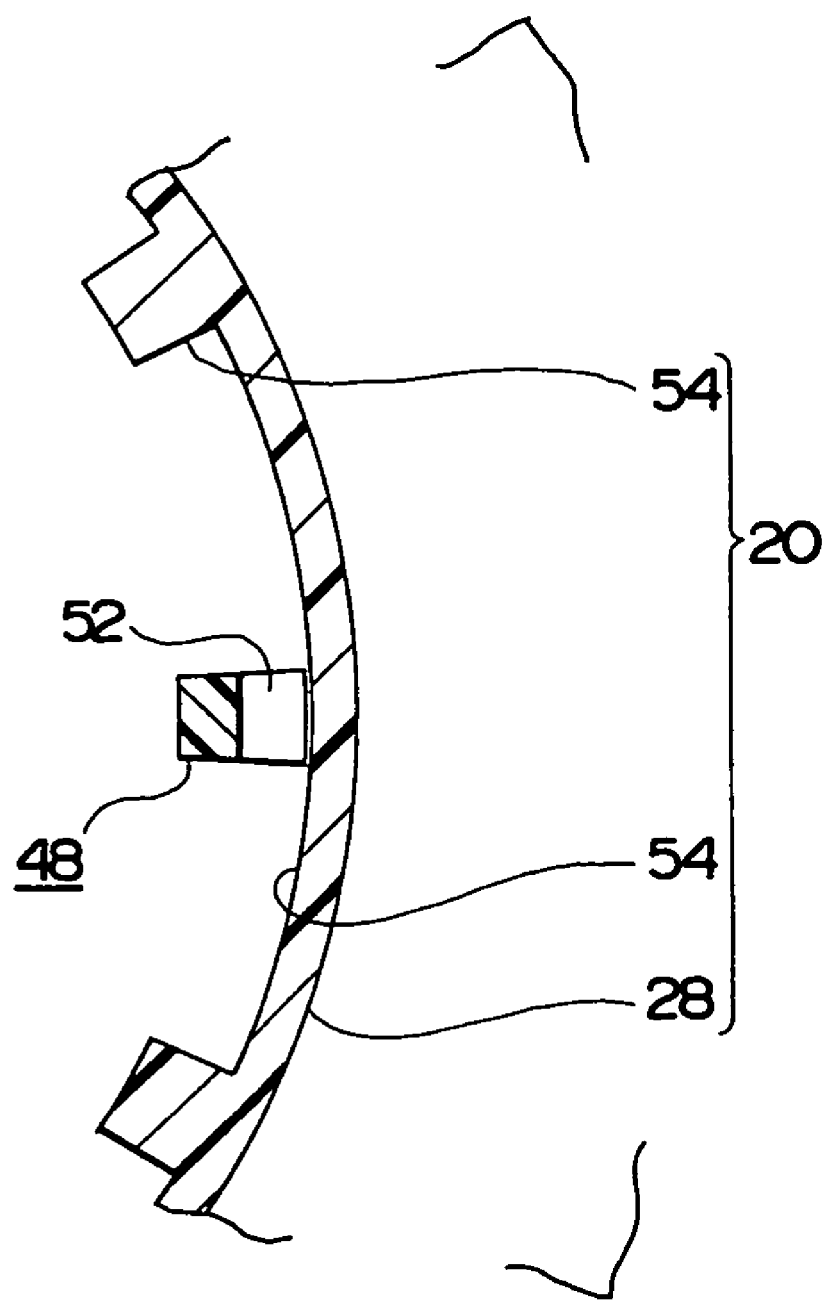
FIG. 5 is a diagram showing an interlocking relationship between an interlock portion of the winding knob and the winding frame.
Figure 6A:
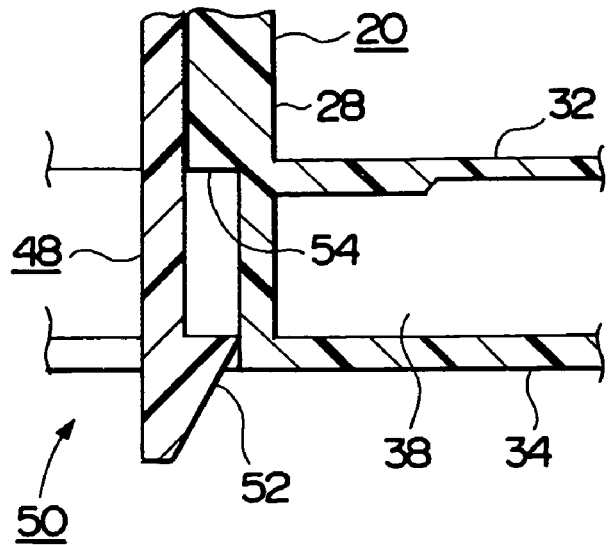
FIG. 6A is a sectional view showing a relationship between the interlock portion and the winding frame before interlocked.
Figure 6B:
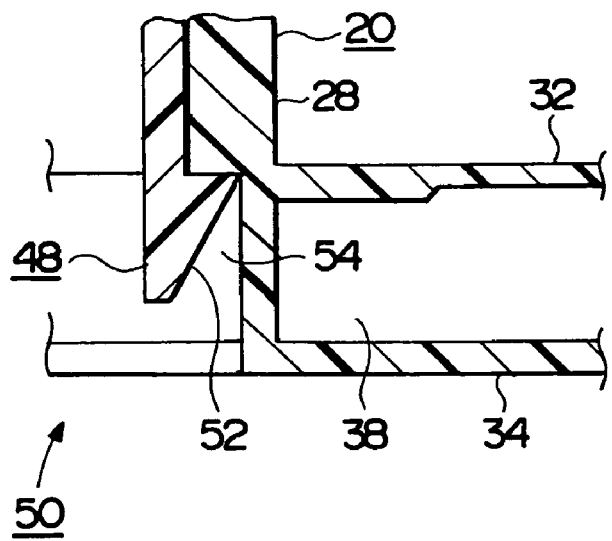
FIG. 6B is a sectional view showing a relationship between the interlock portion and the winding frame which are interlocked.

A clutch mechanism 50 is provided between the interlock portion 48 and the winding core portion 28; in this embodiment, as shown in FIG. 5, FIG. 6A and FIG. 6B, a projection 52 is formed on the outer surface portion of the interlock portion 48; and a plurality of concave portions 54 are formed on the inner wall portion of the winding core portion 28 of the winding frame 20 in a comb-tooth shape. The projection 52 and the concave portion 54 can engage. The concave portion 54 and the projection 52 are formed by offsetting the positions in the vertical direction, such that if the winding knob 22 is retracted (FIG. 2), the engagement between both is released as shown in FIG. 6A and such that if the winding knob 22 is pulled up from the chassis 10 (FIG. 4), both is in an engaged relationship as shown in FIG. 6B. When both are engaged, a turning force applied to the winding knob 22 acts on the winding frame 20 and the winding frame 20 is rotated by the turning force.

Also, a substrate 56 is fixed to the back surface portion of the winding knob 22. In this case, the substrate 56 is positioned and fixed to the back surface side of the winding knob 22 by a platform portion 58 formed on the lower surface portion of the winding knob 22 and a screw 62 penetrating the substrate 56 into a screw holding portion 60 formed on the under surface of the winding knob 22. To support and fix the substrate 56, fixing means such as an adhesive agent may be used. A third connector unit 64 is fixed as a connection unit to the substrate 56, and a window portion 66 is formed as an insert slot corresponding to the connector unit 64 on the upper surface of the winding knob 22. Through this window portion 66, a connector portion 70 of another cable 68 can be attached and detached to the connector unit 64.

A taper portion 72 is formed on the upper surface portion of the housing portion 14 and the taper portion 72 prevents a step from being formed between the winding knob 22 and the housing portion 14. The taper portion 72 also acts as a stiffening member of the housing portion 14.

Figure 7A:
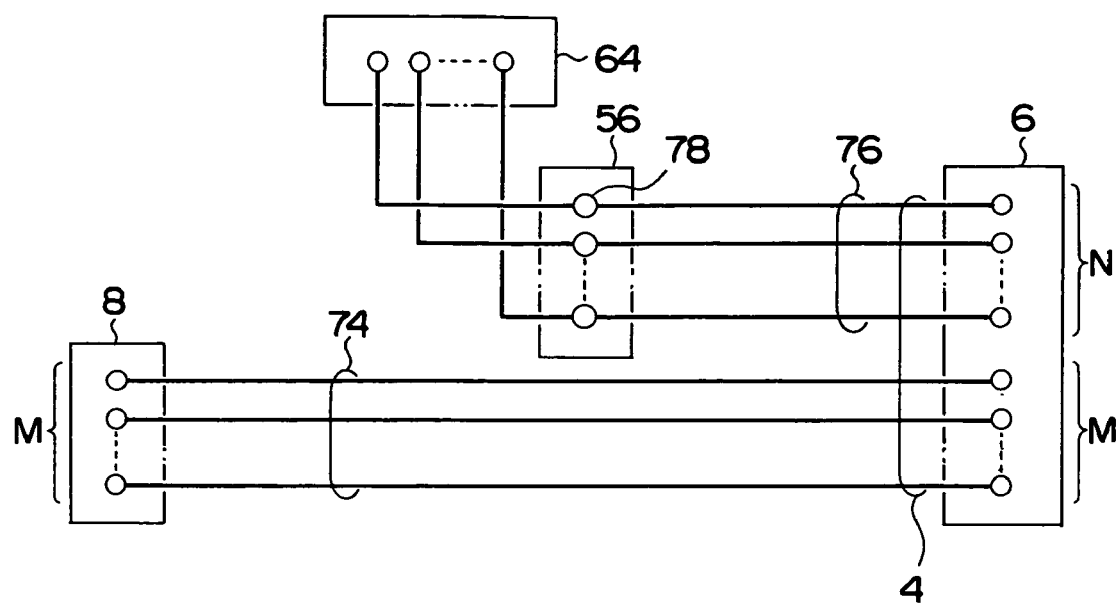
FIG. 7A and FIG. 7B are diagrams showing wiring of the cable apparatus.
Figure 7B:
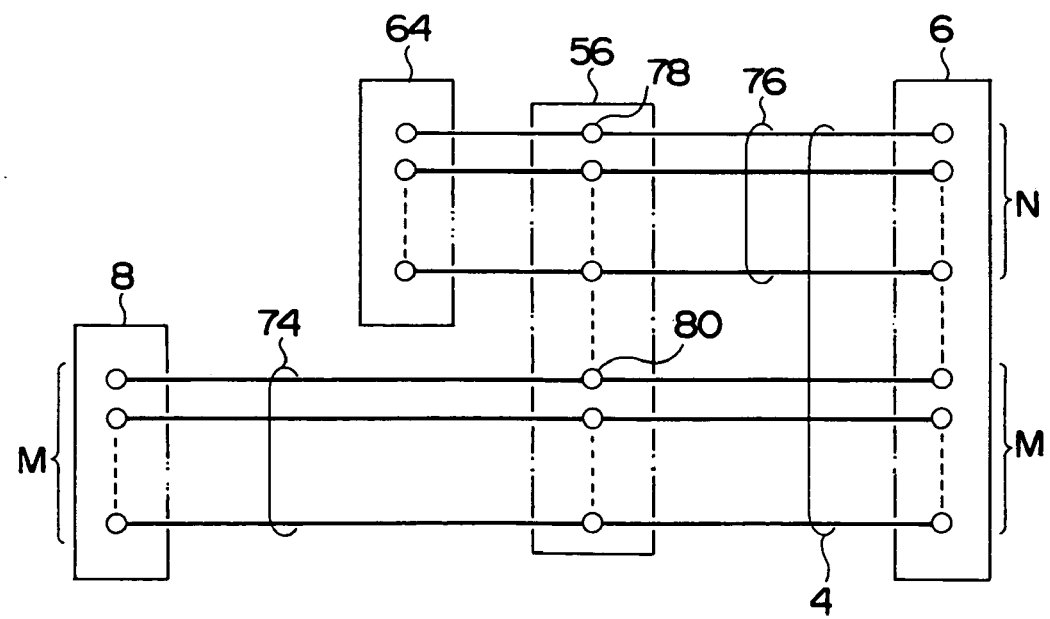

In such a cable apparatus 2, as shown in FIG. 7A, assuming that the cable 4 is provided with, for example, M conductive wires 74 and N conductive wires 76 as a plurality of conductive wires: the M conductive wires 74 and the N conductive wires 76 are connected to one connector unit 6; the M conductive wires 74 are connected to the connector unit 8; and the N conductive wires 76 are connected to the connector unit 64 via conductors 78 of the substrate 56. In accordance with such a configuration, two (2) connector units 8 and 64 are formed for one (1) connector 6 by dividing the cable 4 constituted by the M conductive wires 74 and the N conductive wires 76 to achieve a multifunctional cable apparatus. In this case, for example, as shown in FIG. 7B, the conductive wires 74 may also be connected via conductors 80 of the substrate 56.

Figure 8:
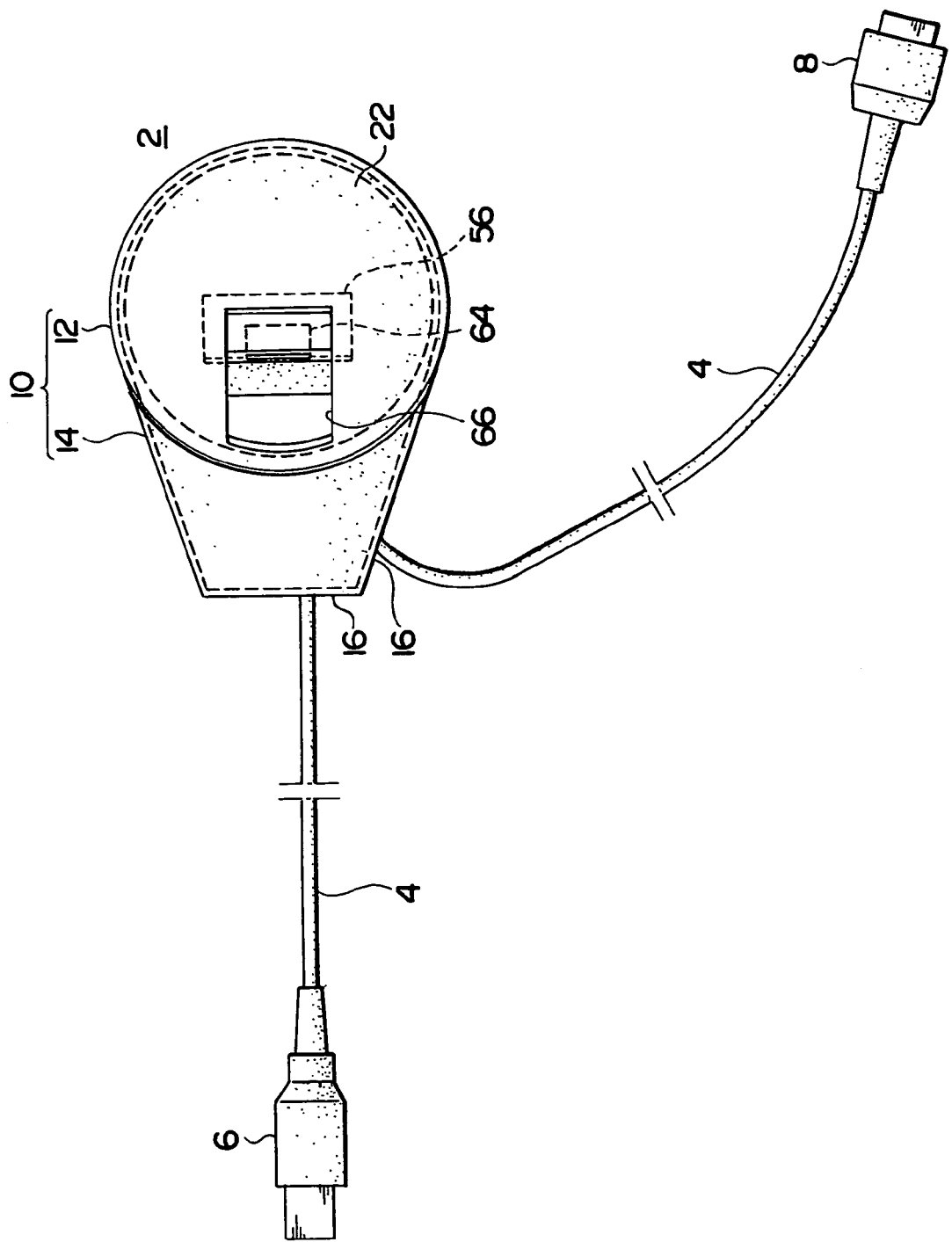
FIG. 8 is a diagram showing the cable apparatus with the cable and the connector unit pulled out.

By configuring in this way, if the cable 4 is unwound by rotating the winding knob 22 to be exposed from the housing portion 14 and a tensile force is applied to the connector units 6 and 8, the cable 4 is unwound and pulled out from the housing portion 12 of the chassis 10, as shown in FIG. 8. In this state, information can be given and received or signals can be transmitted and received by connecting each connector unit 6, 8 to an electronic apparatus such as an information processing apparatus or a portable terminal not shown. In this case, the cable apparatus 2 can be installed adjacent to each electronic apparatus and can be used by optimizing an amount of the cable 4 reeled out. To the connector 64, another electronic apparatus can be connected through another cable 68 (FIGS. 2 and 4).

To wind the cable 4 within the chassis 10: as shown in FIG. 4, the winding knob 22 is pulled up and projected from the chassis 10; the projection 52 of the interlock portion 48 is inserted into the concave portion 54 of the winding core portion 28; and by putting a finger on the window portion 66 and rotating the winding knob 22 with the projection 52 and the concave portion 54 interlocked, a turning force is delivered via the interlock portion 48 to the winding core portion 28 to rotate the winding frame 20 along with the winding knob 22. With this rotation, the cable 4 is divided in two and wound by the winding portions 36 and 38 of the winding core portion 28 and the connector units 6 and 8 at the ends thereof are housed in the housing portion 14.

Second Embodiment

Figure 9:
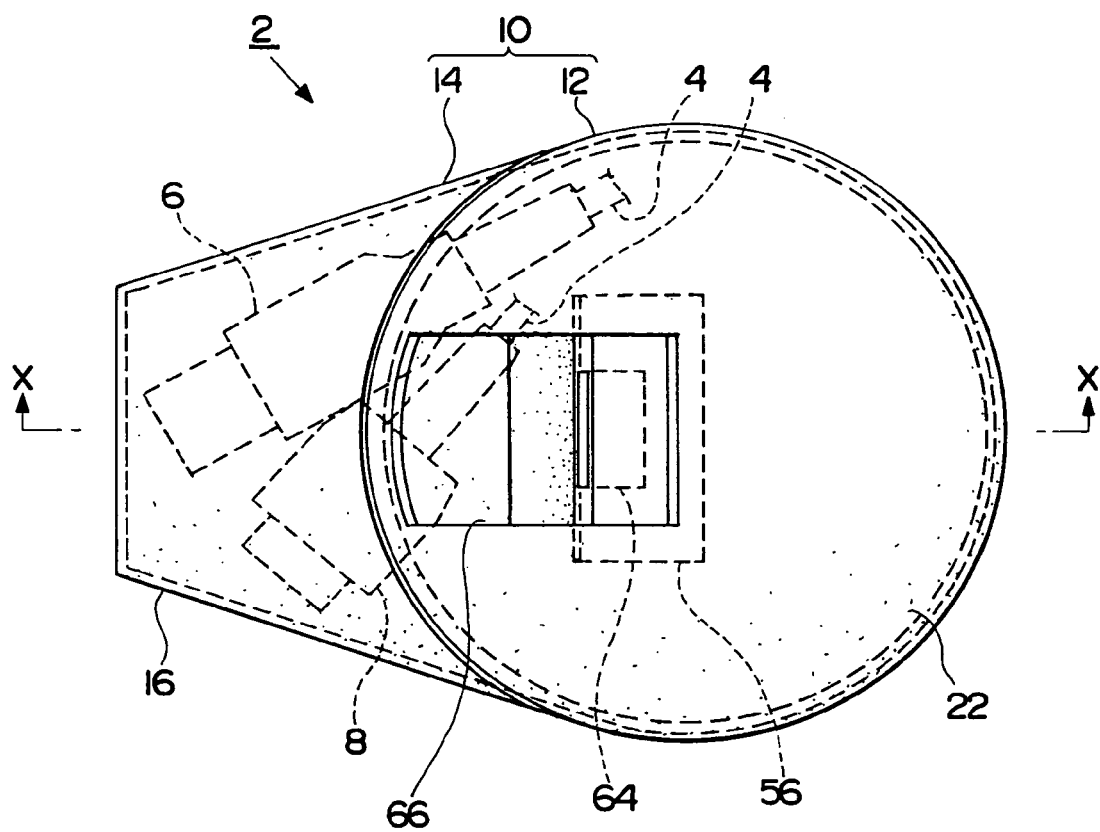
FIG. 9 is a plan view showing a cable apparatus according to a second embodiment.
Figure 10:
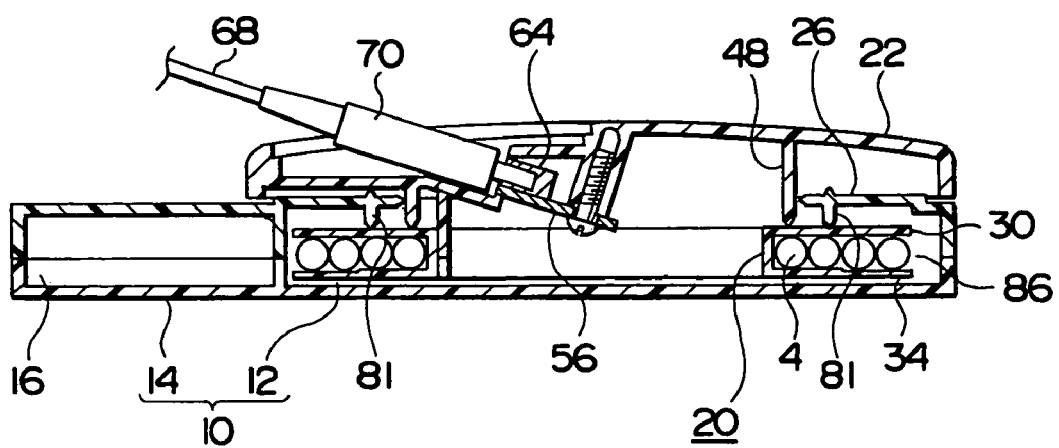
FIG. 10 is a diagram showing a section along an X-X line of the cable apparatus shown in FIG. 9 with connector units of the cable omitted.

Then, a second embodiment of the present invention is described with reference to FIG. 9 and FIG. 10. FIG. 9 and FIG. 10 show a cable apparatus according to the second embodiment; FIG. 9 is a plan view thereof; and FIG. 10 is a diagram showing a section along an X-X line of the cable apparatus of FIG. 9 with the connector units of the cable omitted.

Although the cable is wound and housed as a two-tiered multilayer by forming the two-tiered upper and lower winding portions 36 and 38 on the winding frame 20 in the first embodiment, the cable is wound as a single-tiered multilayer by forming a single winding portion 86 on the winding frame 20 in the second embodiment. While the cable apparatus 2 of the first embodiment can reduce a footprint, the cable apparatus 2 of the second embodiment is planned to be flattened.

In the cable apparatus 2 according to this embodiment, flattening of the apparatus is achieved by flattening the upper surface portion of the housing portion 14 of the chassis 10, by installing the winding knob 22 on the upper portion of the chassis 10 and by fixing the interlock portion 48 of the winding knob 22 to the upper surface portion of the upper flange portion 30 of the winding frame 20. Also, in this case, since an inner edge portion of the top plate portion 26 of the chassis 10 is protruded toward the center direction of the housing portion 12 and a projection 81 is formed on the under surface portion thereof, the top plate portion 26 and the projection 81 can approach and contact the upper surface portion of the upper flange portion 30 of the winding frame 20. Therefore, since the winding frame 20 is prevented by the projection 81 from moving upward, the winding frame 20 is planned to be rotated stably within the housing portion 12.

Third Embodiment

Figure 11A:
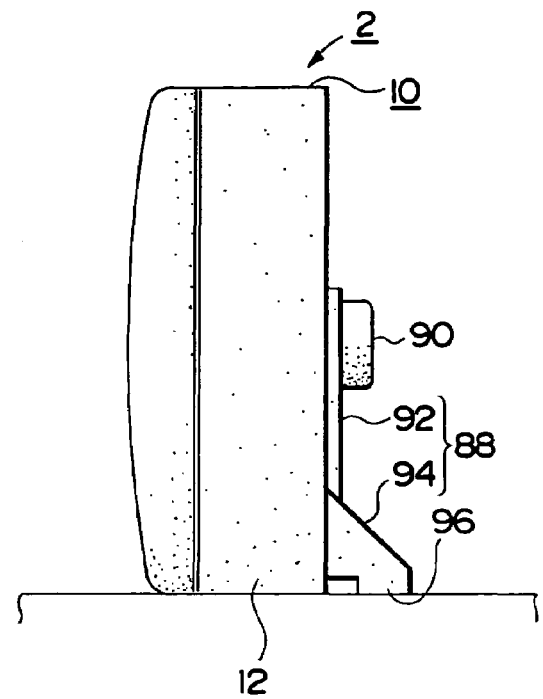
FIG. 11A is a side view showing a cable apparatus according to a third embodiment.
Figure 11B:
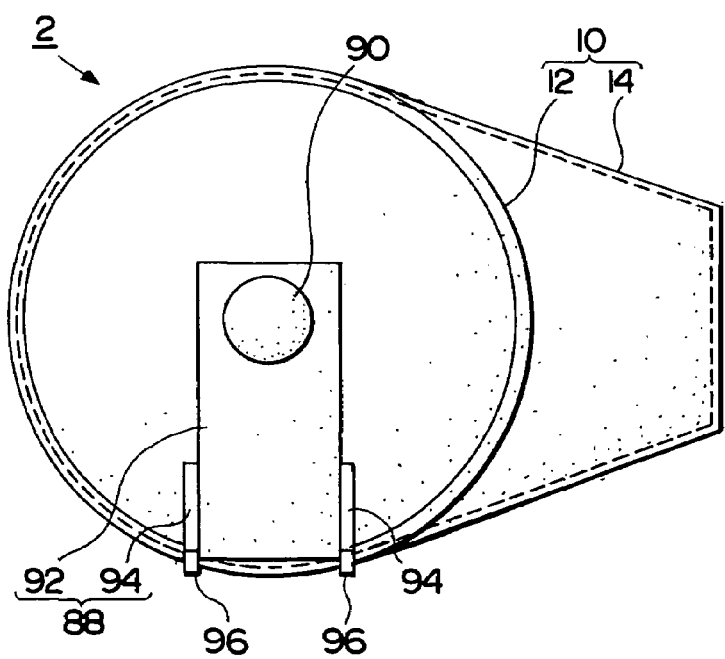
FIG. 11B is a back view showing the cable apparatus according to the third embodiment.

Then, a third embodiment of the present invention is described with reference to FIGS. 11A and B. FIG. 11A is a side view showing a cable apparatus according to a third embodiment and FIG. 11B is a back view thereof.

In the cable apparatus 2 according to the first embodiment installation is planned to be stabilized by flattening bottom surface of the chassis 10 whereas, in the cable apparatus 2 according to the third embodiment, a stand unit 88 is attached as a support unit by a screw 90 to the back surface of the chassis 10. The stand unit 88 is provided with a brace portion 92 appressed and attached to the back surface portion of the chassis 10, a couple of stay portions 94 projected from the lower ends of the brace portion 92 and a support surface portion 96 formed on the under side of the stay portion 94. The under surface of the support surface portion 96 conforms to a side surface portion of the chassis 10 and an installation surface is formed by the side surface portion and the support surface portion 96 to enable the chassis 10 to be installed upright. The screw 90 attached to the brace portion 92 is detachable to enhance the degree of freedom of the installation mode of the cable apparatus 2 such that the cable apparatus 2 can be installed upright if the stand unit 88 is attached and can be installed horizontally by using the bottom surface of the chassis 10 as an installation surface if the stand unit 88 is detached.

Fourth Embodiment

Figure 12A:
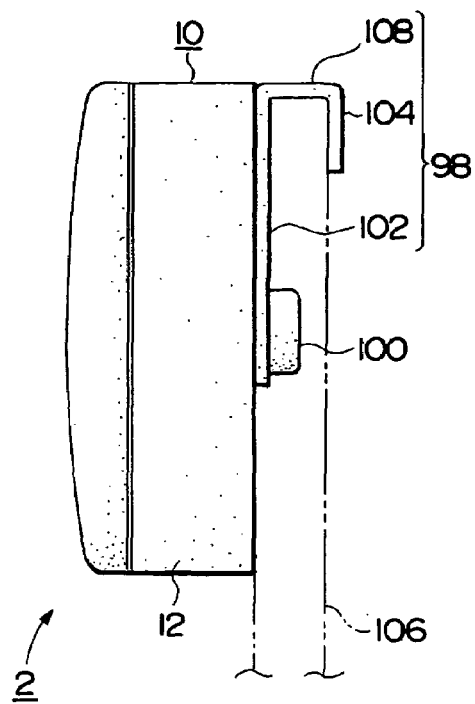
FIG. 12A is a side view showing a cable apparatus according to a fourth embodiment.
Figure 12B:
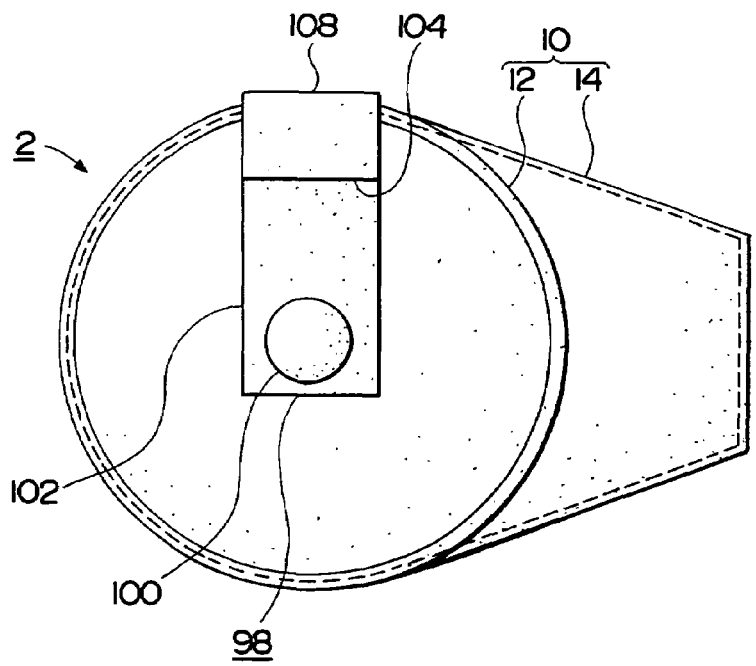
FIG. 12B is a back view showing the cable apparatus according to the fourth embodiment.

Then, a fourth embodiment of the present invention is described with reference to FIGS. 12A and B. FIG. 12A is a side view showing a cable apparatus according to a fourth embodiment and FIG. 12B is a back view thereof.

In the cable apparatus according to a fourth embodiment, a clip unit 98 is attached as a support unit by a screw 100 to the back surface of the chassis 10. The clip unit 98 is provided with a support portion 102 appressed and attached to the back surface portion of the chassis 10 and a hanging portion 104 projected in the U shape from the upper end of the support portion 102. In accordance with such a cable apparatus 2, a work space such as a desktop is not narrowed since the cable apparatus 2 can be hanged and supported on a chassis portion of a personal computer and others, for example, a liquid-crystal display unit 106. In this case, as another installation mode, by utilizing the fact that a top surface portion 108 of the hanging portion 104 conforms to the side surface of the chassis 10, the chassis 10 can be installed upright on a desk and others using the top surface portion 108 as an installation surface, as is the case with the stand unit 88 according to the third embodiment.

Fifth Embodiment

Figure 13:
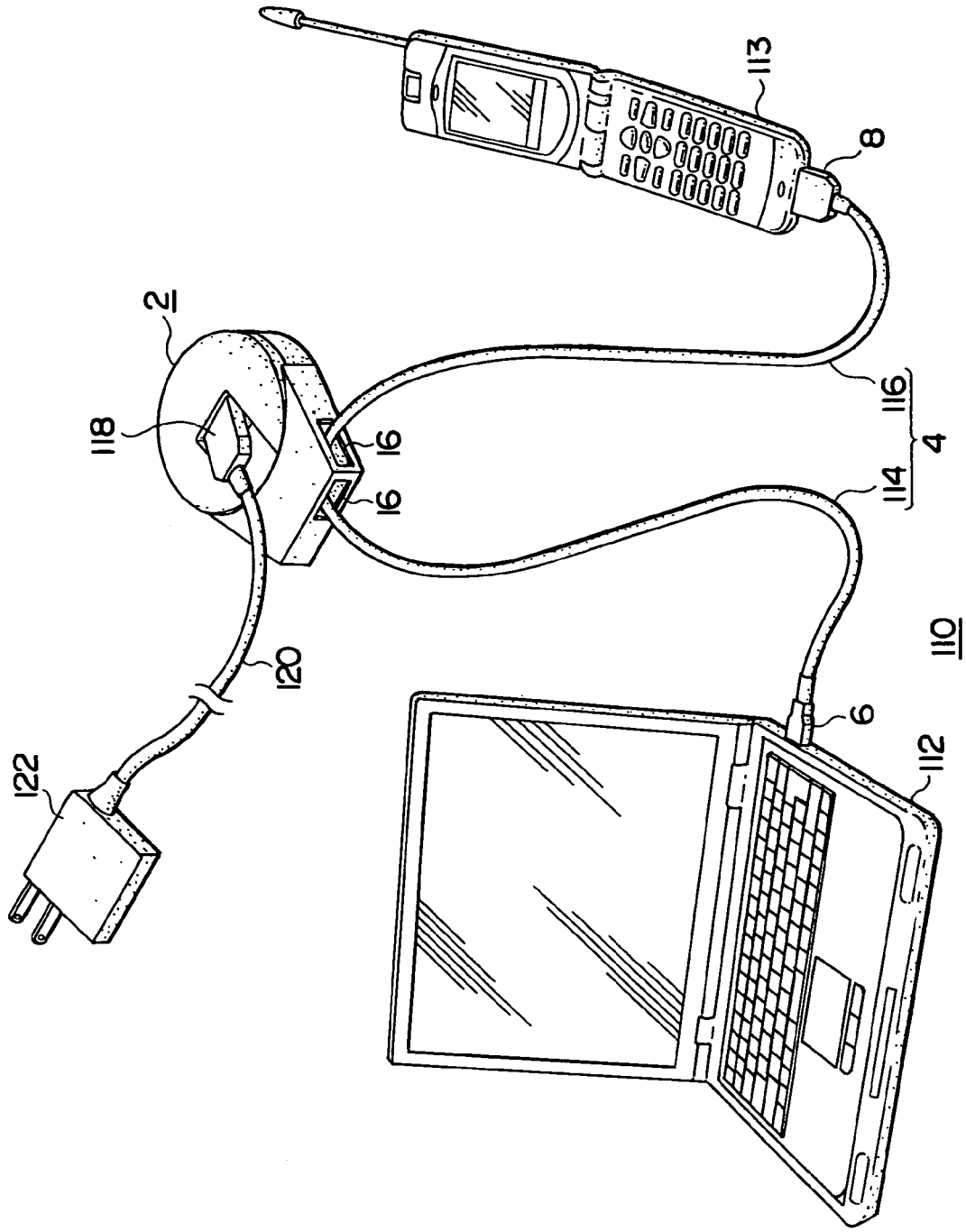
FIG. 13 is a diagram showing an electronic apparatus according to a fifth embodiment.

Then, a fifth embodiment of the present invention is described with reference to FIG. 13. FIG. 13 shows an electronic apparatus according to a fifth embodiment.

In the electronic apparatus 110 according to this embodiment, a portable personal computer 112 is connected to the portable terminal 113 with the cable apparatus 2; a USB (Universal Serial Bus) connector is used for a connector unit 6 connected to a cable 114 side of the cable 4 of this cable apparatus 2; and an IMT (International Mobile Telecommunication)-2000 connector is used for a connector unit 8 connected to a cable 116 side of the cable 4. In other words, the cable 114 is a USB cable with a four-wire configuration and the cable 116 is an IMT-2000 cable consisting of a 10-wire signal line and a coaxial cable. Since direct currents are supplied from outside to the connector unit 8 via the cable 116, the cable apparatus 2 is connected to a connector unit 118 and an AC adaptor 122 which is an alternate current/direct current converter via a cable 120 and direct currents converted from a commercial power source are supplied to the portable terminal 113 via the cable apparatus 2 and the cable 116.

Figure 14:
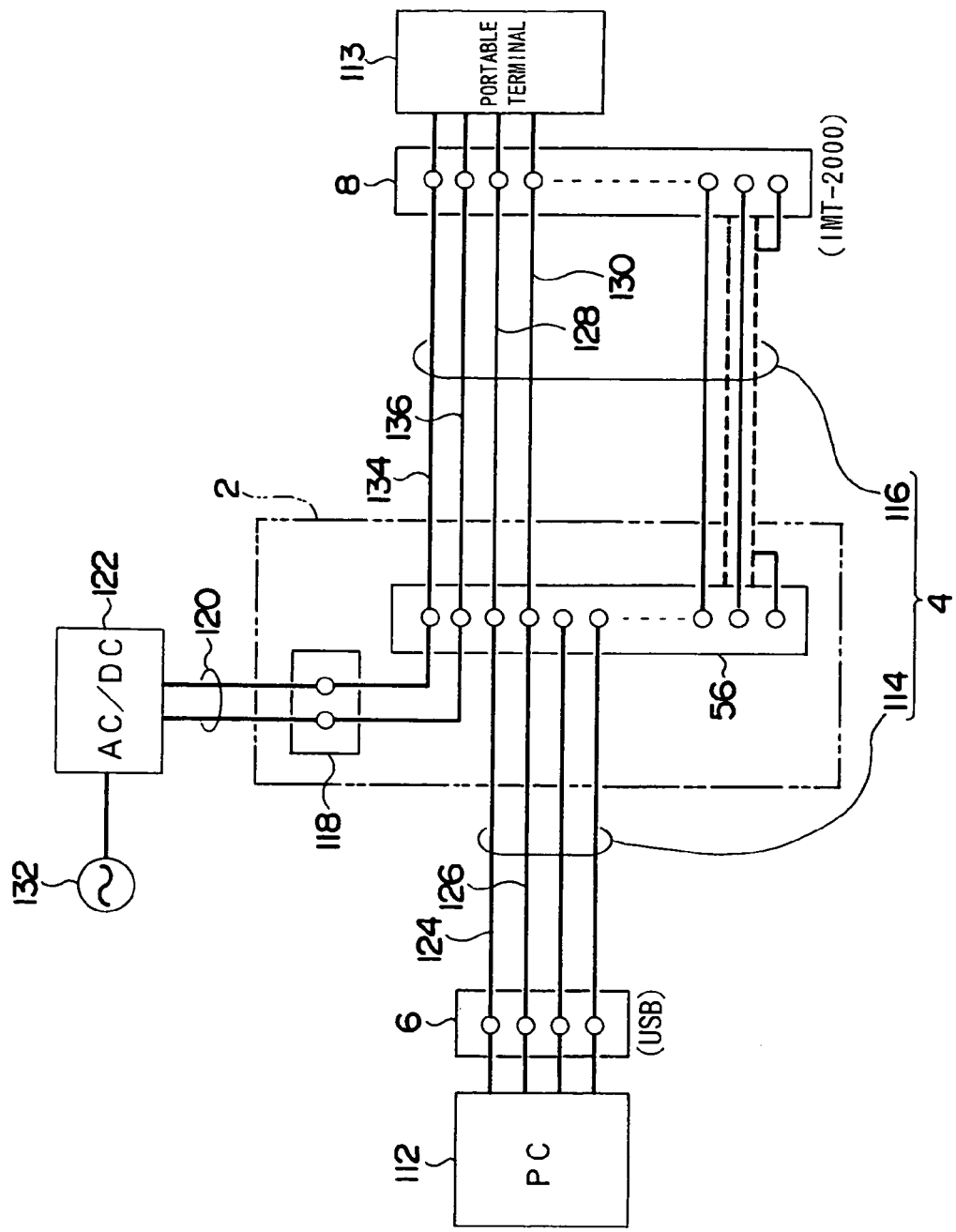
FIG. 14 is a diagram showing wiring of the cable apparatus.

The configurations of the cable apparatus 2 and the cable 4 are, for example, configured as shown in FIG. 14, and the portable personal computer 112 and the portable terminal 113 give/receive data and transmit/receive signals through conductive wires 124, 126 of the cable 114, the substrate 56 and conductive wires 128, 130 of the cable 116. The portable terminal 113 is supplied with direct currents obtained by rectifying an alternate-current power source 132 with the AC adaptor 122 through the cable 120, connector unit 118 and conductive wires 134, 136 of the cable 116. Therefore, this cable apparatus 2 is a connector converter for the connector units 6, 8 with different specifications as well as acts as a power supply unit for the direct-current power source.

By the way, conventional housing and winding of a cable are configured to store only a cable within an electronic apparatus and a housing unit, and other cables and the like associated with the cable are not connected. Therefore, inconveniently, a separate cable and the like must be prepared and be connected as needed for performing connection relevant to the connection of the cable. For example, when the portable personal computer 112 and the portable terminal 113 give and receive information, if the personal computer cannot supply power, power feeding to the portable terminal is dependent on a built-in battery. Also, inconveniently, the cable must be detached to feed power from the AC adaptor 122 and information cannot be given and received until charging of the built-in battery is completed, however, by using the cable apparatus 2, the power feeding to the portable terminal 113 can be performed through a commercial power source, in addition to giving and receiving information and transmitting and receiving signals, with the single cable apparatus 2 to enhance convenience.

Then, for the embodiments of the cable apparatus described above, the technical significance, modifications and others are listed as follows.

(1) Since the cable apparatus 2 is configured as described above, the chassis 10, the winding frame 20, the winding knob 22 and the like can be manufactured by molding processes with synthetic resin such as polypropylene. In other words, lightweight cable apparatus 2 can be achieved with synthetic resin. In the embodiments, the cable apparatus 2 is described as being made of synthetic resin, the cable apparatus 2 is also planned to be lightweight and downsized even when made of metal materials such as aluminum.

(2) In the cable apparatus 2 according to the first embodiment, two (2) winding portions 36, 38 are formed as a multi-tiered winding portion in the axial direction of the winding frame 20, and therefore, when the wound length of the cable 4 is identical, the vertical projection area of the winding frame 20 and the footprint of the chassis 10 can be reduced for downsizing. In accordance with such a cable apparatus 2, the chassis 10 can be miniaturized and the area occupied by the cable apparatus 2 can be reduced for contributing to effective utilization of the usable area such as a desktop.

(3) Since the cable apparatus 2 is provided with the chassis 10 housing the cable 4 which has the connector units 6, 8 connected to the electronic apparatus, the winding mechanism 18 winding and storing the cable 4 within the chassis 10, and the winding knob 22 which is an operation unit for winding the cable 4 onto the winding mechanism 18 by applying a turning force to the winding mechanism 18, the cable 4 can be wound within the chassis 10 and the connector units 6, 8 can be housed and easily pulled out with operation of the winding knob 22 only, and the cable 4 and the connector units 6, 8 can be planned to be downsized as well as protected by the chassis 10.

(4) Since the winding knob 22 as operation unit is configured to be pulled up from the chassis 10 to operate the winding mechanism 18 when used and retracted to the chassis 10 side when not in use as described in the first embodiment, the winding operation is facilitated and the cable apparatus 2 is downsized.

(5) Since the chassis 10 is provided with the substrate 56 and the connector unit 64 which is a connection unit connected to the cable 4, composite connection between electronic apparatuses can be achieved by installing connector units and cables associated with the cable 4.

(6) As described in the third and fourth embodiments, since the chassis 10 is provided with the support unit supported by an external support member and the support units are configured as the stand unit 88 and the clip unit 98, diverse installation modes can be selected to be used, such as installing or attaching to a desk, other devices or clothes using these support units, and the cable apparatus 2 can be fixed to and used at a certain place to enhance convenience.

(7) As described in the fifth embodiment, by using the cable apparatus 2 for cable connection between the electronic apparatuses, the cable connection can be organized to enhance functionality of the electronic apparatuses. In other words, in accordance with the electronic apparatus constituted by connecting an information processing apparatus and a portable terminal via the cable apparatus 2 and by connecting a power source to the connection unit of the chassis 10, the single cable apparatus 2 can achieve the cable connection between the electronic apparatuses as well as power supply to simplify the cable connection relationship at the periphery of the electronic apparatuses.

(8) By configuring such that a connection unit is provided on the chassis 10 of the cable apparatus 2 and such that the connection unit divides the cable 4 through the intervention of the substrate 56 to connect some conductive wires of the cable 4 to the connector unit, other cables or electronic apparatuses can be easily connected to the cable by utilizing the connector unit, and the cable apparatus 2 can be multifunctional.

(9) Although the embodiments are configured to install the connector unit 64 on the substrate 56 disposed on the chassis 10, a cable may be pulled out from the substrate 56 and the cable may be connected to the connector unit or another electronic apparatus.

(10) In the embodiments, since the winding start portion 42 of the cable 4 of the winding frame 20 is disposed by penetrating the middle flange portion 32, the winding start portion 42 of the cable 4 can be easily moved and the chassis 10 of the cable apparatus 2 can be moved to a desired position on the full length of the cable 4.

(11) The winding knob 22 is attached to the chassis 10 so as to be freely retracted and extended; the clutch mechanism 50 is provided between the winding core portion 28 and the winding knob 22; the winding core portion 28 of the winding frame 20 is configured to be interlocked with the interlock portion 48 of the winding knob 22 by pulling out the winding knob 22; therefore, only when the winding knob 22 is pulled out, the cable 4 can be wound; when the winding knob 22 is retracted, the winding of the cable 4 can be released; and the cable 4 is not carelessly taken in or out.

(12) Although the housing of the single cable 4 is described in the embodiments, a plurality of cables may be housed by, for example, winding each cable onto each winding portion 36, 38 of the winding frame 20. In this case, the wound amounts of the cables may be varied by changing the diameters of the winding core portions 28 of the winding portions 36, 38 of the winding frame 20, which have been set to the same diameter. The diameter of the winding core portions 28 may be changed in this way for the single cable 4, and in this case the position of the chassis 10 can be correspondingly adjusted relative to the cable 4 since the wound amount is changed.

(13) In the embodiments, a guide roller or guide projection as a cable guide portion may be provided on, for example, the inner wall surface of the housing portions 12, 14 of the chassis 10, and by installing such a cable guide portion, the moving cable 4 can be smoothly wound round and unwound.

Although the most preferred embodiments, etc., of the present invention have been described hereinabove, the present invention is not intended to be limited to the description and can naturally be modified or changed by one skilled in the art based on the gist of the present invention defined in claims or disclosed in the best mode for carrying out the invention, and it is needless to say that such modifications and changes are within the scope of the present invention.

In a cable apparatus of the present invention, a cable and connector units are pulled out from a chassis when used; when the cable is not in use or even when the cable is used, an unnecessary length can be wound and housed within the chassis; the cable and the connector units can be easily pulled out and housed; the cable and the connector units can be protected with the chassis; and the convenient cable apparatus can be achieved, which is useful.

In the cable apparatus of the present invention, when operated, an operation unit is pulled up from the chassis to operate a winding mechanism; the operation unit can be pulled down to the chassis side when not operated; downsizing can be planed when not operated; operability of the winding operation can be enhanced when operated; and the winding operation of the cable is facilitated and planned to be downsized.

In the cable apparatus of the present invention, a cable connected to various electronic apparatuses can be planned to be downsized and the cable apparatus can contribute to enhancement of functionality of the electronic apparatuses.

The invention claimed is:

1. A cable apparatus for use in connecting electronic apparatuses, comprising:
   a chassis housing a cable with connector unit connected to the electronic apparatuses;
   a winding mechanism winding and housing the cable within the chassis, wherein the winding mechanism includes a winding frame to wind the cable; and
   an operation unit applying a turning force to the winding frame and allowing the winding frame to wind the cable,
   wherein the winding frame includes a winding core winding the cable,
   wherein the operation unit includes a plurality of interlock portions retractably and extendably inserted into the winding core of the winding frame, and the operation unit is configured wherein the interlock portions retract from or extend toward the winding core to be pulled up from or pushed down toward the chassis side,
   wherein a clutch portion is disposed between the interlock portions and the winding core,
   wherein the clutch portion allows the interlock portions to engage the winding core if the operation unit is pulled up from the chassis, and wherein the clutch portion allows the interlock portions to disengage the winding core if the operation unit is pushed down, and
   wherein when the winding core of the winding frame is engaged with the operation unit by the clutch portion, the winding mechanism winds the cable via the turning force applied to the operation unit.

2. The cable apparatus of claim 1, wherein the winding frame is provided with a plurality of winding portions that are partitioned by disposing a plurality of flange portions on a middle portion of the winding core, and wherein the cable is wound onto each of the winding portions.

3. The cable apparatus of claim 1, wherein the cable has a first connector unit at one end and a second connector unit at the other end to connect the electronic apparatuses, and wherein the operation unit is provided with a third connector unit connected to the first connector unit.

4. The cable apparatus of claim 3, wherein the first connector unit is connected to the third connector unit via another cable that is different from the cable.

5. The cable apparatus of claim 1, wherein the chassis is provided with a support unit supported by an external support member.

6. The cable apparatus of claim 1, wherein the clutch portion includes at least one concave portion extending radially inward from an inner wall portion of the winding core and at least one projection extending radially outward from an axial end of at least one interlock portion of the plurality of interlock portions, wherein the operation unit is pulled up from the chassis to engage an upper face of the at least one projection of the at least one interlock portion of the plurality of interlock portions with an engagement surface of a corresponding one of the concave portion and is pushed down toward the chassis to release the engagement thereof.

7. The cable apparatus of claim 6, wherein the at least one concave portion includes a plurality of concave portions and each interlock portion of the plurality of interlock portions includes the projection.

8. The cable apparatus of claim 6, wherein the at least one projection and the at least one concave portion are formed in an offset position relative to a vertical direction extending from the chassis to the operation unit.

9. The cable apparatus of claim 1, wherein two or more winding portions winding the cable are disposed in the chassis in the axial direction thereof.

10. The cable apparatus of claim 1, wherein the chassis is provided with a stand unit supporting the chassis upright on an outer surface portion of the chassis.

11. The cable apparatus of claim 1, wherein a clip unit having a support member support the chassis is provided on an outer surface of the chassis.

12. The cable apparatus of claim 1, wherein the chassis is provided with a housing portion housing the connector unit of the cable.

13. The cable apparatus of claim 1, wherein the winding frame includes a flange portion having a penetration portion through which the cable passes to be fixed to the winding frame.

* * * * *